US010885317B2

(12) United States Patent
Yoo et al.

(10) Patent No.: US 10,885,317 B2
(45) Date of Patent: Jan. 5, 2021

(54) APPARATUSES AND METHODS FOR RECOGNIZING OBJECT AND FACIAL EXPRESSION ROBUST AGAINST CHANGE IN FACIAL EXPRESSION, AND APPARATUSES AND METHODS FOR TRAINING

(71) Applicant: Samsung Electronics Co., Ltd., Suwon-si (KR)

(72) Inventors: Byung In Yoo, Seoul (KR); Youngjun Kwak, Seoul (KR); Youngsung Kim, Suwon-si (KR); Seohyung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/225,084

(22) Filed: Dec. 19, 2018

(65) Prior Publication Data
US 2019/0213399 A1 Jul. 11, 2019

(30) Foreign Application Priority Data
Jan. 8, 2018 (KR) .......................... 10-2018-0002105

(51) Int. Cl.
*G06K 9/00* (2006.01)
*G06N 3/04* (2006.01)
(Continued)

(52) U.S. Cl.
CPC ..... *G06K 9/00302* (2013.01); *G06K 9/00268* (2013.01); *G06K 9/00281* (2013.01);
(Continued)

(58) Field of Classification Search
CPC .......... G06K 9/00302; G06K 9/00268; G06K 9/00281; G06K 9/00355; G06K 9/6274;
(Continued)

(56) References Cited

U.S. PATENT DOCUMENTS

2010/0278385 A1 11/2010 Song et al.
2011/0007174 A1 1/2011 Bacivarov et al.
(Continued)

FOREIGN PATENT DOCUMENTS

EP 3 023 911 A1 5/2016
JP 2005-293539 A 10/2005
(Continued)

OTHER PUBLICATIONS

Guo, Yimo et al., "Dynamic Facial Expression Recognition With Atlas Construction and Sparse Representation", *IEEE Transactions on Image Processing*, vol. 25, Issue: 5, May 2015 (pp. 1977-1992).
(Continued)

*Primary Examiner* — Diane D Mizrahi
(74) *Attorney, Agent, or Firm* — NSIP Law

(57) ABSTRACT

A facial expression recognition apparatus and method and a facial expression training apparatus and method are provided. The facial expression recognition apparatus generates a speech map indicating a correlation between a speech and each portion of an object based on a speech model, extracts a facial expression feature associated with a facial expression based on a facial expression model, and recognizes a facial expression of the object based on the speech map and the facial expression feature. The facial expression training apparatus trains the speech model and the facial expression model.

24 Claims, 15 Drawing Sheets

(51) Int. Cl.
  *G06K 9/62* (2006.01)
  *G06N 3/08* (2006.01)
  *G10L 17/02* (2013.01)
  *G10L 25/63* (2013.01)
  *G10L 25/78* (2013.01)

(52) U.S. Cl.
  CPC ....... *G06K 9/00315* (2013.01); *G06K 9/6274* (2013.01); *G06N 3/04* (2013.01); *G06N 3/084* (2013.01); *G10L 17/02* (2013.01); *G10L 25/63* (2013.01); *G10L 25/78* (2013.01)

(58) Field of Classification Search
  CPC .... G06K 9/00315; G06K 9/6256; G06N 3/04; G06N 3/084; G10L 17/02; G10L 25/63; G10L 25/78; A47G 25/16; A47G 25/40; A47G 25/4046
  See application file for complete search history.

(56) References Cited

U.S. PATENT DOCUMENTS

| | | | |
|---|---|---|---|
| 2015/0310263 | A1 | 10/2015 | Zhang et al. |
| 2016/0042548 | A1 | 2/2016 | Du et al. |
| 2017/0026567 | A1 | 1/2017 | Neghina et al. |
| 2017/0060521 | A1 | 3/2017 | Cellier et al. |
| 2017/0185826 | A1 | 6/2017 | Shreve et al. |
| 2017/0213075 | A1 | 7/2017 | Whitehill et al. |
| 2018/0133900 | A1* | 5/2018 | Breazeal ............... G06F 40/117 |
| 2019/0122373 | A1* | 4/2019 | Natroshvili .......... G06N 3/0445 |

FOREIGN PATENT DOCUMENTS

| | | | |
|---|---|---|---|
| JP | 2010-117948 | A | 5/2010 |
| JP | 5632100 | B2 | 11/2014 |
| KR | 10-2011-0026137 | A | 3/2011 |
| KR | 10-2012-0077485 | A | 7/2012 |
| KR | 10-1309954 | B1 | 9/2013 |
| KR | 10-2015-0093480 | A | 8/2015 |
| KR | 10-2016-0024725 | A | 3/2016 |
| KR | 10-2016-0027576 | A | 3/2016 |
| KR | 10-1728635 | B1 | 4/2017 |
| KR | 10-1759444 | B1 | 7/2017 |

OTHER PUBLICATIONS

Extended European Search Report dated Jun. 7, 2019 in Counterpart European Application No. 18208336.0 (7 pages in English).

Khorrami, Pooya et al., "Do Deep Neural Networks Learn Facial Action Units When Doing Expression Recognition?", *2015 IEEE International Conference on Computer Vision Workshop (ICCVW)*, Oct. 10, 2015 (pp. 19-27).

Jung, Heechul et al. "Joing Fine-Tuning in Deep Neural Networks for Facial Expression Recognition", *2015 IEEE International Conference on Computer Vision (ICCV)*, Dec. 2015 (pp. 2983-2991).

Benitez-Quiroz, C. Fabian et al., "EmotioNet: An Accurate, Real-Time Algorithm for the Automatic Annotation of a Million Facial Expressions in the Wild", *2016 IEEE Conference on Computer Vision and Pattern Recognition (CVPR)*, Jun. 2016 (pp. 5562-5570).

* cited by examiner

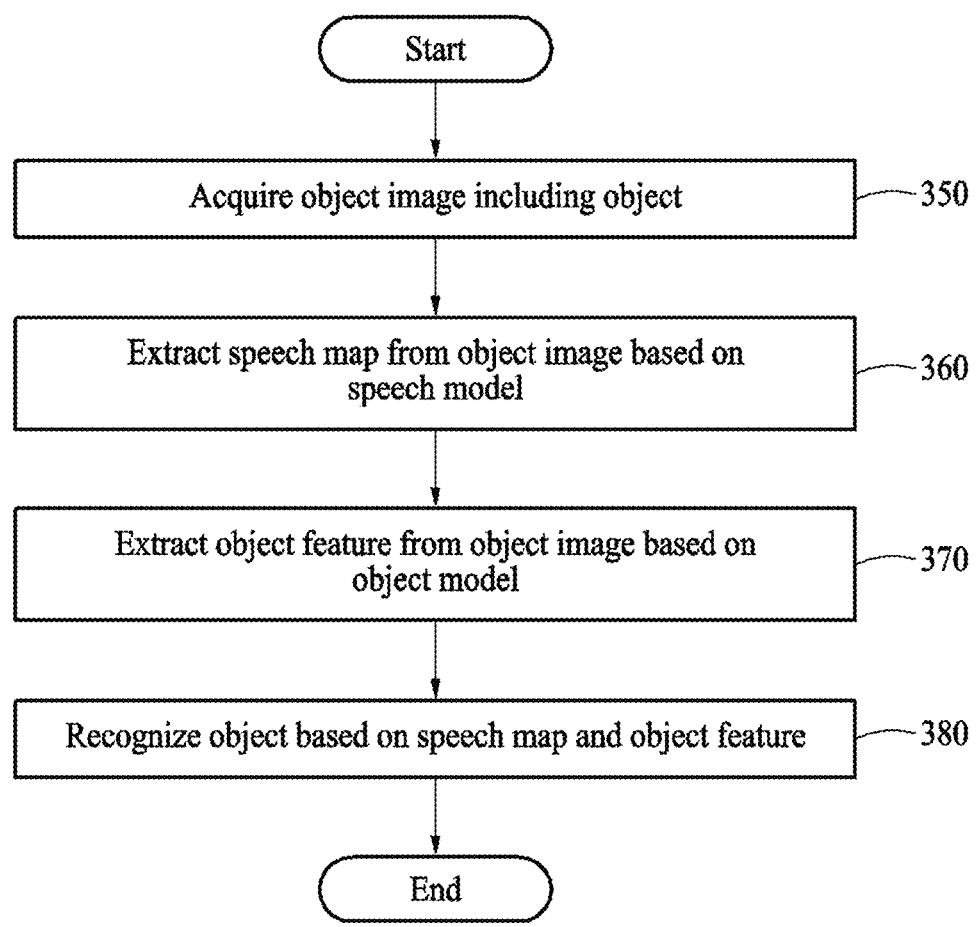

APPARATUSES AND METHODS FOR RECOGNIZING OBJECT AND FACIAL EXPRESSION ROBUST AGAINST CHANGE IN FACIAL EXPRESSION, AND APPARATUSES AND METHODS FOR TRAINING

CROSS-REFERENCE TO RELATED APPLICATIONS

This application claims the benefit under 35 USC § 119(a) of Korean Patent Application No. 10-2018-0002105, filed on Jan. 8, 2018, in the Korean Intellectual Property Office, the entire disclosure of which is incorporated herein by reference for all purposes.

BACKGROUND

1. Field

The following description relates to recognizing an object and a facial expression to be robust against a change in a facial expression.

2. Description of Related Art

Recently, to attempt to address an issue of classifying an input pattern as a predetermined group, research is being actively conducted on trying to apply an efficient pattern recognition method for computer applications. The research includes research on an artificial neural network (ANN) that is obtained by modeling characteristics of pattern recognition by mathematical expressions. The ANN generates mapping between input patterns and output patterns using an algorithm, and a capability of generating the mapping is expressed as a learning capability of the ANN. The ANN has a generalization capability to generate a relatively correct output in response to an input pattern that has not been used for training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of recognizing a facial expression based on a speech, the method including acquiring an object image including an object, extracting a speech map from the object image based on a speech model, extracting a facial expression feature from the object image based on a facial expression model, and recognizing a facial expression of the object based on the speech map and the facial expression feature.

The recognizing of the facial expression may include reducing a value corresponding to a feature associated with the speech in the facial expression feature, based on the speech map, and increasing a value corresponding to a feature that is not associated with the speech in the facial expression feature, based on the speech map.

The extracting of the speech map may include generating the speech map by determining a weight based on a correlation between the speech and each area of the object image using the speech model.

The generating of the speech map may include increasing a weight of a target area of the object image, in response to an increase in a correlation between the target area and the speech, based on the speech model, and decreasing the weight of the target area, in response to a decrease in the correlation between the target area and the speech, based on the speech model.

The recognizing of the facial expression may include inverting the speech map, and recognizing the facial expression based on the inverted speech map and the facial expression feature.

The inverting of the speech map may include inverting the speech map by subtracting values of the speech map from a maximum value.

The extracting of the speech map may include extracting, based on the speech model, a speech feature vector that indicates a portion of the object image corresponding to the speech of the object, and the extracting of the facial expression feature may include extracting, based on the facial expression model, a facial expression feature vector that indicates a portion of the object image corresponding to the facial expression.

The recognizing of the facial expression may include generating an inverted vector by inverting the speech feature vector, generating a target vector by applying the inverted vector to the facial expression feature vector, and identifying the facial expression based on the target vector.

The identifying of the facial expression may include determining a facial expression label corresponding to the facial expression from among facial expression labels, based on the target vector.

The identifying of the facial expression may include generating a normalized vector by normalizing the target vector, and identifying the facial expression based on the normalized vector.

The recognizing of the facial expression may include excluding a voice signal of the object from the recognizing of the facial expression.

The acquiring of the object image may include acquiring an input image associated with the object and may include frame images that are consecutive, and sequentially selecting a frame image from the frame images as the object image, and the recognizing of the facial expression may include sequentially recognizing facial expressions of the object for each of the frame images.

The method may include acquiring a voice signal associated with the object, wherein the extracting of the speech map may include extracting the speech map from the object image, based on the voice signal and the speech model.

In another general aspect, there is provided a method of recognizing an object based on a speech, the method including acquiring an object image including an object, extracting a speech map from the object image based on a speech model, extracting an object feature from the object image based on an object model, and recognizing the object based on the speech map and the object feature.

In another general aspect, there is provided a method of training a facial expression based on a speech, the method including acquiring a reference image and a reference facial expression, and training, by a processor, a parameter of a facial expression model and a parameter of a speech model to output the reference facial expression, in response to an input of the reference image, based on the facial expression model and the speech model, wherein the facial expression model is configured to extract a facial expression feature from an object image, and the speech model is configured to extract a speech map from the object image.

The acquiring of the reference image and the reference facial expression may include acquiring a reference voice corresponding to the reference image, and the training of the parameters may include restoring voice information from a speech map that is extracted from the reference image based on the speech model, and training the speech model by minimizing a speech loss between the restored voice information and the reference voice.

The training of the parameters may include training the facial expression model by minimizing a facial expression loss between the reference facial expression and a facial expression that is recognized from the reference image, based on the facial expression model and the speech model.

The parameters may include applying a speech map extracted from the reference image based on the speech model to a facial expression feature extracted from the reference image based on the facial expression model, and minimizing a facial expression loss between a facial expression label determined based on the facial expression feature to which the speech map is applied and a label that corresponds to the reference facial expression.

The applying of the speech map may include inverting the extracted speech map and reflecting the inverted speech map to the extracted facial expression feature.

In another general aspect, there is provided an apparatus to recognize a facial expression based on a speech, the apparatus including a memory configured to store a facial expression model, speech model, and instructions, and a processor configured to execute the instructions to acquire an image of an object, extract a speech map from the image based on the speech model, extract a facial expression feature from the image based on the facial expression model, and recognize a facial expression of the object based on the speech map and the facial expression feature.

The processor may be configured to extract, based on the speech model, a speech feature vector indicating a portion of the image corresponding to the speech of the object, invert the speech feature vector, extract, based on the facial expression model, a facial expression feature vector indicating a portion of the image corresponding to the facial expression, and identify the facial expression based on applying the inverted vector to the facial expression feature vector.

The processor may include an image acquirer configured to capture the image, a speech feature detector configured to detect, based on the speech model, a speech feature vector indicating a portion of the image corresponding to the speech, a facial expression feature extractor configured to extract, based on the facial expression model, a facial expression feature vector indicating a portion of the image corresponding to the facial expression, and a facial expression recognizer configured to determine a label corresponding to the facial expression of the object based on the speech feature vector and the facial expression feature vector.

The processor may include a voice acquire configure to acquire a voice signal, wherein the speech feature detector is further configured to detect the speech feature vector based on the voice signal and the image.

Other features and aspects will be apparent from the following detailed description, the drawings, and the claims.

BRIEF DESCRIPTION OF THE DRAWINGS

FIG. 3B is a diagram illustrating an example of a method of recognizing an object based on a speech.

Figure 1:
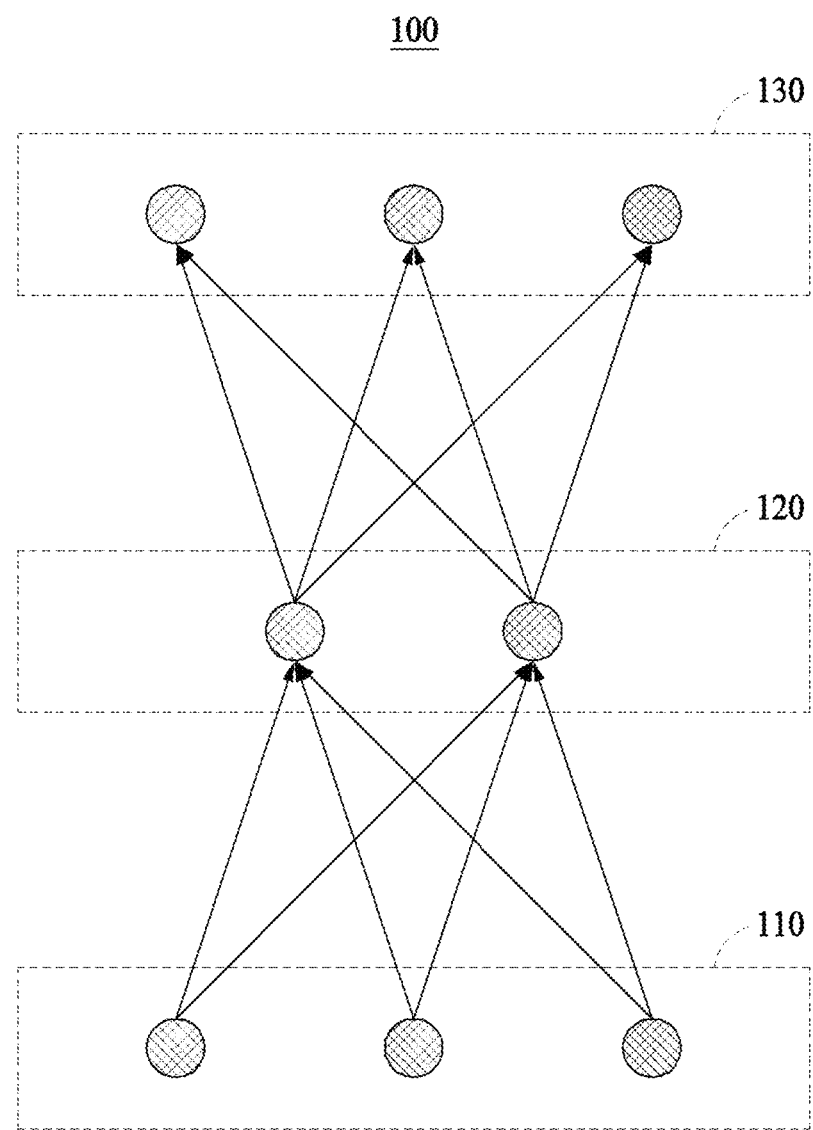
FIG. 1 illustrates an example of a model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are examples to merely describe the examples, and the scope of the examples is not limited to the descriptions provided in the present specification.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the singular forms are intended to include the plural forms as well, unless the context clearly indicates otherwise. It should be further understood that the terms "includes," "including," "has," comprises," and/or "comprising," when used in this specification, specify the presence of stated features, integers, steps, operations, elements, components or a combination thereof, but do not preclude the presence or addition of one or more other features, integers, steps, operations, elements, components, and/or groups thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

Hereinafter, examples will be described in detail with reference to the accompanying drawings, and like reference numerals in the drawings refer to like elements throughout.

FIG. 1 illustrates an example of a model.

Each of a facial expression model, an object model and a speech model may include, for example, a neural network 100. In an example, a method and an apparatus (hereinafter, referred to as a "facial expression recognition apparatus") for recognizing a facial expression based on a speech using the neural network 100 are provided. Also, a method and an apparatus (hereinafter, referred to as a "facial expression training apparatus") for training the neural network 100 based on a speech are provided. In the following description, a recognition includes a verification and an identification. The verification is an operation of determining whether input data is true or false, and the identification is an operation of determining which one of a plurality of labels is indicated by input data.

Referring to FIG. 1, the neural network 100 includes a plurality of layers that each include a plurality of nodes. Also, the neural network 100 includes connection weights that connect a plurality of nodes included in one of the plurality of layers to nodes included in another layer. In an example, a facial expression training apparatus acquires the neural network 100 from an internal database (DB) stored in a memory, or receives the neural network 100 from an external server via a communicator and acquires the neural network 100.

The neural network 100 is implemented by, for example, software, hardware or a combination thereof. In an example, the neural network 100 is referred to as an "artificial neural network (ANN)."

The nodes of the neural network 100 are connected to each other via edges with connection weights. A connection weight is a value of an edge, and is referred to as a "connection intensity."

In an example, the neural network 100 includes a plurality of layers. For example, the neural network 100 includes an input layer 110, a hidden layer 120 and an output layer 130. The input layer 110 receives an input to perform training or recognition, and transfers the input to the hidden layer 120. The output layer 130 generates an output of the neural network 100 based on a signal received from the hidden layer 120. The hidden layer 120 is located between the input layer 110 and the output layer 130, and changes a training input of training data received via the input layer 110 to a value that is relatively more easily predictable.

Each of the input layer 110, the hidden layer 120, and the output layer 130 includes a plurality of nodes. A node included in the input layer 110 is referred to as an "input node," a node included in the hidden layer 120 is referred to as a "hidden node," and a node included in the output layer 130 is referred to as an "output node."

Input nodes included in the input layer 110 and hidden nodes included in the hidden layer 120 are connected to each other via edges with connection weights. Also, hidden nodes included in the hidden layer 120 and output nodes included in the output layer 130 are connected to each other via edges with connection weights.

A neural network includes a plurality of hidden layers, although not shown. The neural network including the plurality of hidden layers is referred to as a "deep neural network (DNN)" or an n-layer neural network. The DNN or n-layer neural network may correspond to a convolutional neural network (CNN), a recurrent neural network (RNN), a deep belief network, a fully connected network, a bi-directional neural network, or a restricted Boltzman machine, or may include different or overlapping neural network portions respectively with full, convolutional, recurrent, and/or bi-directional connections. For example, the neural network 100 may be embodied as a CNN, but is not limited thereto. In FIG. 1, some convolution layers of a CNN corresponding to an example of the neural network 100 are illustrated, but the CNN may further include, in addition to the illustrated convolution layers, a pooling layer or a fully connected layer.

Training of the DNN is referred to as "deep learning." For example, when the hidden layer 120 is assumed to include a first hidden layer, a second hidden layer and a third hidden layer, an output of a hidden node included in the first hidden layer is connected to hidden nodes included in the second hidden layer. Also, an output of a hidden node included in the second hidden layer is connected to hidden nodes included in the third hidden layer.

For example, the facial expression training apparatus and the facial expression recognition apparatus input outputs of previous hidden nodes included in a previous hidden layer to each hidden layer via edges with connection weights, and generates outputs of hidden nodes included in each hidden layer based on an activation function and values obtained by applying connection weights to the outputs of the previous hidden nodes. In an example, to transmit an output to a next hidden node, a result of an activation function needs to exceed a threshold of a current hidden node. In this example, a node does not transmit a signal to a next node until reaching threshold activation strength through input vectors, and remains in an inactive state.

The facial expression training apparatus trains the neural network 100 through supervised learning. The facial expression training apparatus is implemented by, for example, a hardware module or a combination of a software module and a hardware module. The supervised learning is a scheme of inputting, to the neural network 100, a training input of training data together with a training output corresponding to the training input and updating connection weights of edges so that output data corresponding to the training output is output. The training data is data including a pair of a training input and a training output. Although the structure of the neural network 100 is expressed as a node structure in FIG. 1, examples are not limited to the node structure. For example, various data structures may be used to store a neural network in a memory storage.

In an example, the facial expression training apparatus determines parameters of nodes included in a neural network through a gradient descent scheme based on an error that is propagated backwards to the neural network and based on output values of the nodes. For example, the facial expression training apparatus updates connection weights between nodes through error backpropagation learning. The error backpropagation learning is a scheme of estimating an error by a forward computation of given training data, propagating the estimated error backwards from an output layer to a hidden layer and an input layer, and updating connection weights to reduce an error. The neural network 100 is processed in an order of the input layer 110, the hidden layer 120, and the output layer 130, however, connection weights in the error backpropagation learning are updated in an order of the output layer 130, the hidden layer 120 and the input layer 110. For example, at least one processor uses a buffer memory configured to store layers or calculation data to process a neural network in a desired order.

The facial expression training apparatus defines an objective function to measure how close currently set connection weights are to an optimal value, continues to change the connection weights based on a result of the objective function, and repeatedly performs training. For example, the objective function is a loss function used to calculate a loss between an expected value to be output and an actual output value based on a training input of training data in the neural network 100. The facial expression training apparatus updates the connection weights by reducing a value of the loss function.

Figure 2:
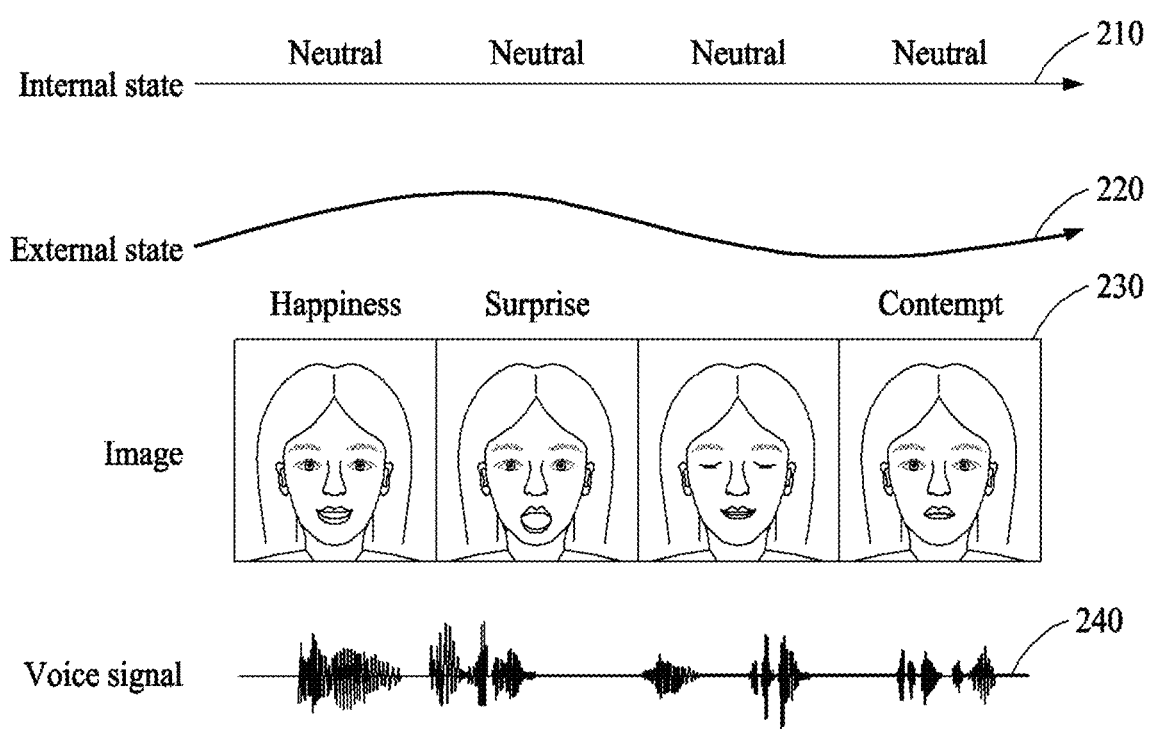
FIG. 2 illustrates an example of a change in a facial expression based on a speech.

FIG. 2 illustrates an example of a change in a facial expression based on a speech.

In the present disclosure, a speech is an action of speaking of an object, such as, for example, a human.

When a plurality of frame images are acquired by capturing an object while the object speaks, each of the plurality of frame images represents a temporal aspect of a series of processes by which the object speaks. Thus, an internal state (for example, an emotion) of the speaking object remains unchanged, however, an external state (for example, an overall look) of the object is recognized to change.

For example, FIG. 2 illustrates a gap between an internal state 210 and an external state 220 when an object speaks. A voice signal 240 is generated based on a speech of the object, and a plurality of frame images 230 that correspond to the voice signal 240 and that are associated with the object are acquired. The internal state 210 is a neutral state from a start to an end of the speech. The external state 220 appears to be changed to happiness, surprise and contempt from the start to the end of the speech.

Hereinafter, a method and apparatus for accurately recognizing a facial expression based on a speech while an object speaks are described.

Figure 3A:
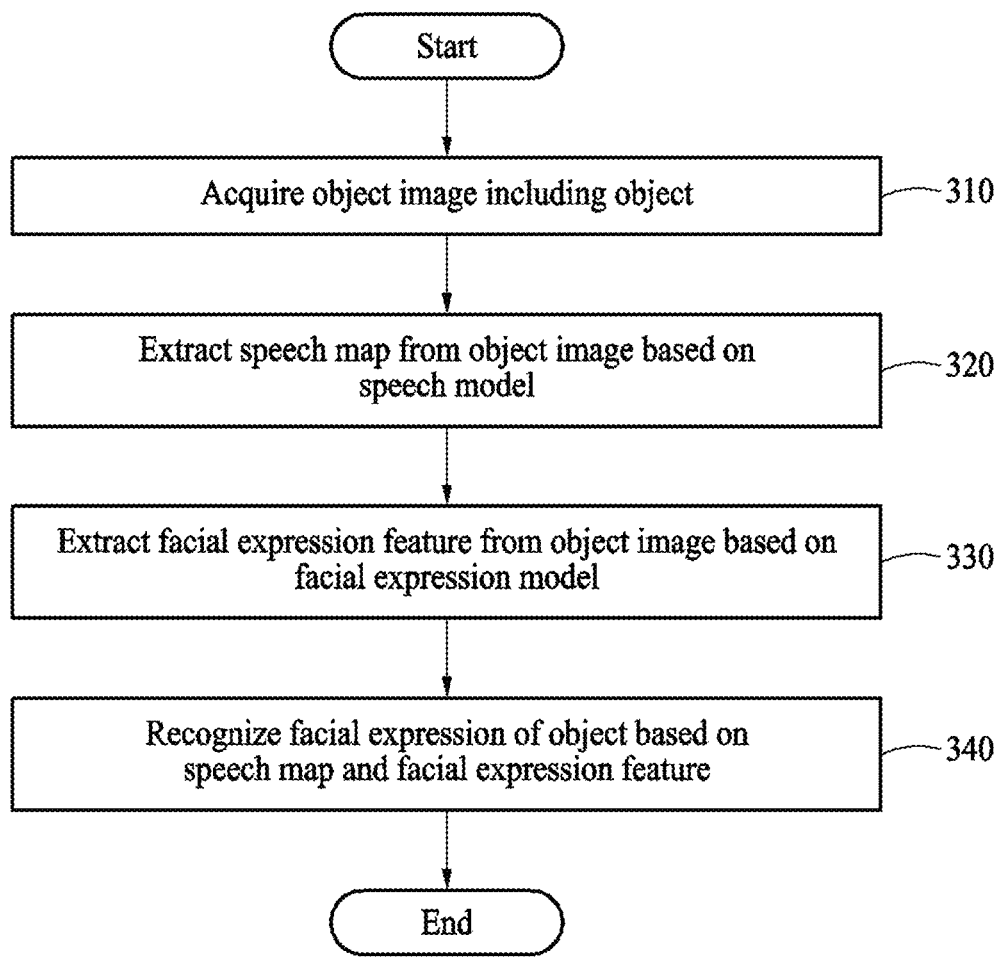
FIG. 3A is a diagram illustrating an example of a method of recognizing a facial expression based on a speech.

FIG. 3A is a diagram illustrating an example of a method of recognizing a facial expression based on a speech. The operations in FIG. 3A may be performed in the sequence and manner as shown, although the order of some operations may be changed or some of the operations omitted without departing from the spirit and scope of the illustrative examples described. Many of the operations shown in FIG. 3A may be performed in parallel or concurrently. One or more blocks of FIG. 3A, and combinations of the blocks, can be implemented by special purpose hardware-based computer that perform the specified functions, or combinations of special purpose hardware and computer instructions. In addition to the description of FIG. 3A below, the descriptions of FIGS. 1-2 are also applicable to FIG. 3A, and are incorporated herein by reference. Thus, the above description may not be repeated here.

Referring to FIG. 3A, in operation 310, a facial expression recognition apparatus acquires an object image including an object. As described above, the object is, for example, a human. The object image is, for example, an image including at least a portion of the object. For example, the object image is an image that includes a face of a human as at least a portion of the human. In an example, the facial expression recognition apparatus acquires the object image by capturing at least a portion of the object using a camera. In an example, the facial expression recognition apparatus acquires an input image that is associated with the object and that includes a plurality of consecutive frame images. The facial expression recognition apparatus sequentially selects one of a plurality of frame images as an object image.

In operation 320, the facial expression recognition apparatus extracts a speech map from the object image based on a speech model. A processor of the facial expression recognition apparatus calculates the speech map by inputting the object image to the speech model. The speech map is, for example, information that indicates an area associated with the speech in the object image. For example, the speech map includes "m" horizontal elements and "n" vertical elements, and a value assigned to each element indicates a correlation level with the speech. In this example, "m" and "n" are integers. The object image also includes "m" horizontal pixels and "n" vertical pixels. Elements of the speech map correspond to pixels of the object image. For example, a value assigned to an element corresponding to an arbitrary pixel of the object image indicates a correlation level between the pixel and the speech. A resolution of the object image and a number of pixels included in the object image may be identical to a resolution of the speech map and a number of elements in the speech map, however, examples are not limited thereto. The speech model is a model that is trained to output a speech map corresponding to a reference voice in response to an input of a reference image, and has, for example, a machine learning structure including a neural network.

In operation 330, the facial expression recognition apparatus extracts a facial expression feature from the object image based on a facial expression model. The processor of the facial expression recognition apparatus inputs the object image to the facial expression model and extracts the facial expression feature. The facial expression feature is a feature associated with a facial expression of an object. The facial expression model is a model that is trained to output a reference facial expression in response to an input of a reference image, and has, for example, a machine learning structure including a neural network.

In operation 340, the facial expression recognition apparatus recognizes a facial expression of the object based on the facial expression feature and the speech map. For example, the facial expression recognition apparatus inverts the speech map, reflects the inverted speech map to the facial expression feature, generates a target vector, and identifies the facial expression of the object based on the generated target vector. For example, when a plurality of frame images are acquired, the facial expression recognition apparatus sequentially recognizes facial expressions of the object for each of the plurality of frame images.

Also, the facial expression recognition apparatus excludes a voice signal of the object from a recognition of a facial expression. The facial expression recognition apparatus extracts the speech map based on the speech model even when the voice signal is excluded.

However, examples are not limited thereto, and in an example, the facial expression recognition apparatus acquires a voice signal associated with the object. For example, the facial expression recognition apparatus extracts a speech map from the object image based on a reference image and a voice signal.

FIG. 3B is a diagram illustrating an example of a method of recognizing an object based on a speech. The operations in FIG. 3B may be performed in the sequence and manner as shown, although the order of some operations may be changed or some of the operations omitted without departing from the spirit and scope of the illustrative examples described. Many of the operations shown in FIG. 3B may be performed in parallel or concurrently. One or more blocks of FIG. 3B, and combinations of the blocks, can be implemented by special purpose hardware-based computer that perform the specified functions, or combinations of special purpose hardware and computer instructions. In addition to the description of FIG. 3B below, the descriptions of FIGS. 1-3A are also applicable to FIG. 3B, and are incorporated herein by reference. Thus, the above description may not be repeated here.

Although the method of recognizing a facial expression based on a speech has been described with reference to FIG. 3A, examples are not limited thereto. In an example, an object recognition apparatus recognizes an object based on a speech.

Referring to FIG. 3B, in operation 350, the object recognition apparatus acquires an object image including an object. As described above, the object is, for example, a human. The object image is, for example, an image including at least a portion of the object. For example, the object image is an image that includes a face of a human as at least a portion of the human.

In operation 360, the object recognition apparatus extracts a speech map from an object image based on a speech model. A processor of the object recognition apparatus inputs the object image to the speech model to calculate the speech map.

In operation 370, the object recognition apparatus extracts an object feature from the object image based on an object model. The processor of the object recognition apparatus inputs the object image to the object model and extracts the object feature. The object feature is, for example, a feature associated with the object and obtained by abstracting the object. For example, when an object is a human and when an object image includes a face as at least a portion of the human, an object feature is a feature associated with the face. The object model is a model that is trained to output a reference object in response to an input of a reference image, and has, for example, a machine learning structure including a neural network.

In operation 380, the object recognition apparatus recognizes the object based on the object feature and the speech map.

In an example, the object recognition apparatus inverts the speech map, reflects the inverted speech map to the object feature, generates a target vector, and identifies the object based on the target vector. The object recognition apparatus determines an object label corresponding to the object among a plurality of object labels from the target vector. The object label indicates, for example, an identity of the object.

In another example, the object recognition apparatus extracts a first object feature from a first object image based on the object model. The object recognition apparatus reflects an inverted speech map to the first object feature and generates a first target vector. Also, the object recognition apparatus extracts a second object feature from a second object image based on the object model. The object recognition apparatus reflects the inverted speech map to the second object feature and generates a second target vector. The object recognition apparatus verifies the object based on the first target vector and the second target vector. For example, the first object image is a target image that is to be verified, and the second object image is a registration image that is used as a criterion of verification, however, examples are not limited thereto.

In an example, the object recognition apparatus verifies whether the first object image and the second object image indicate the same object, based on a comparison between the first target vector and the second target vector. The object recognition apparatus calculates a similarity score between the first target vector and the second target vector. When the similarity score exceeds a threshold similarity, the object recognition apparatus determines that the first target vector and the second target vector are similar. When the first target vector and the second target vector are determined to be similar, the object recognition apparatus determines that the first object image and the second object image indicate the same object. For example, when an object of a registration image is identical to an object of a target image, the object recognition apparatus determines that an authentication of a user corresponding to the object of the target image is valid. For example, the object recognition apparatus is implemented in a smart device or an authentication device. In this example, the object recognition apparatus determines that an object of a registration image is identical to an object of a target image by performing the above-described operation, and permits an access to the smart device in response to a valid authentication.

Figure 4:
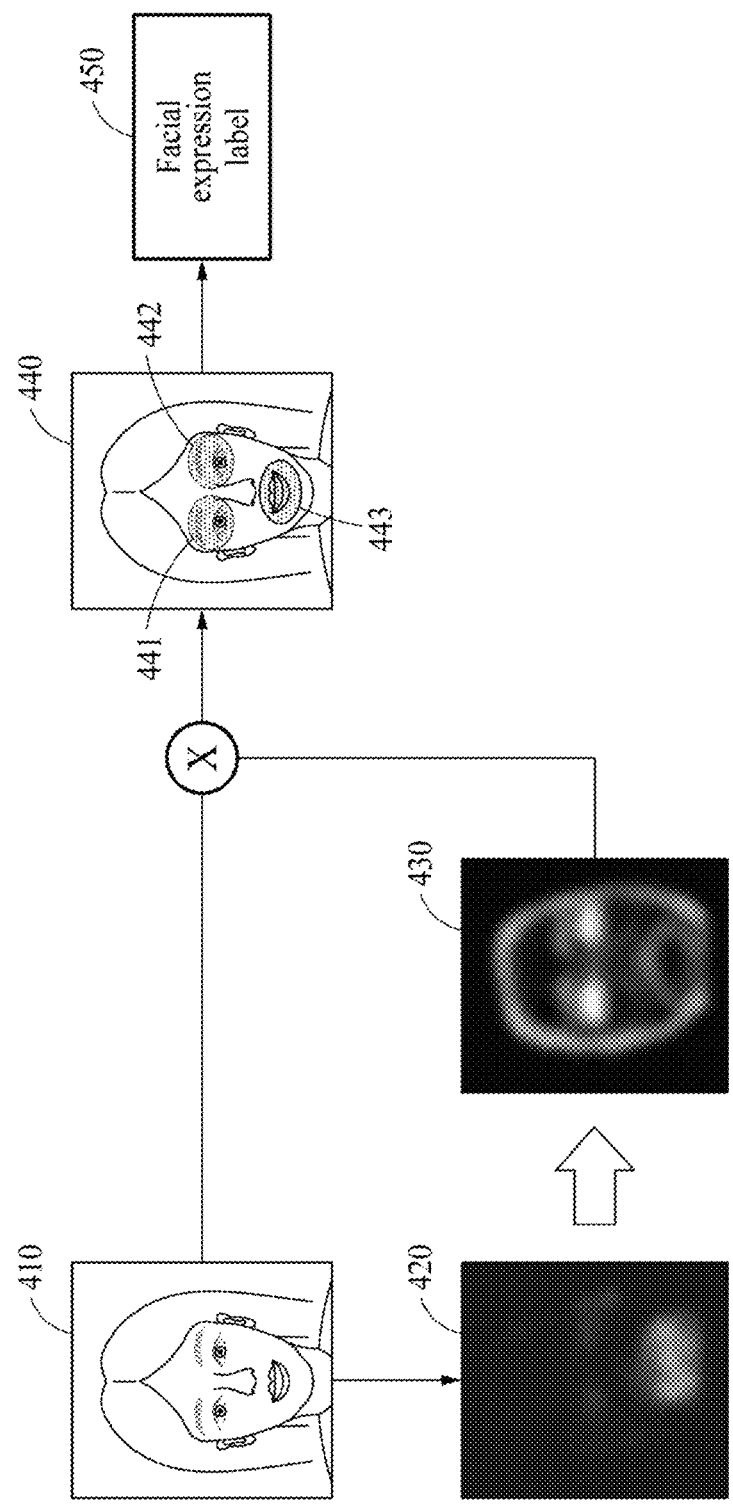
FIG. 4 illustrates an example of a process of recognizing a facial expression based on a speech model and a facial expression model.

FIG. 4 illustrates an example of a process of recognizing a facial expression based on a speech model and a facial expression model.

A facial expression recognition apparatus acquires an object image 410. As described above, a camera of the facial expression recognition apparatus generates the object image 410 by capturing an object. The facial expression recognition apparatus extracts a facial expression feature from the object image 410.

The facial expression recognition apparatus extracts a speech map 420 from the object image 410. Each of elements included in the speech map 420 corresponds to a pixel included in the object image 410, and has a value corresponding to a correlation level between the pixel and a speech. For example, the facial expression recognition apparatus determines, using a speech model, a weight based on a correlation between the speech and each area of the object image 410, to generate the speech map 420. The speech map 420 of FIG. 4 is, for example, a map expressed by an intensity value that indicates a correlation with the speech.

The speech map 420 includes the same number of elements as a number of pixels included in the object image 410, and the elements respectively correspond to the pixels. An intensity value is assigned to an element included in the speech map 420. In the speech map 420, when an intensity value assigned to an element increases, a brightness of the element increases. Thus, a relatively bright portion of the speech map 420 corresponds to a relatively high correlation degree with the speech. Also, the speech map 420 is expressed by a speech feature vector.

The facial expression recognition apparatus determines, based on the speech model, a weight of a target area of the object image 410 to increase in response to an increase in a correlation level between the target area and the speech. Also, the facial expression recognition apparatus determines, based on the speech model, the weight of the target area of the object image 410 to decrease in response to a decrease in the correlation level between the target area and the speech. The target area includes, for example, a plurality of pixels associated with the speech in the object image 410. For example, the facial expression recognition apparatus assigns, to an element corresponding to the target pixel, a value (for example, a value between "0" and "1") within a range determined in proportion to information about a correlation between the target pixel and the speech.

In an example, the facial expression recognition apparatus inverts the speech map 420 to generate an inverted speech map 430. The facial expression recognition apparatus subtracts values of the speech map 420 from a maximum value, such as, for example, "1" to invert the speech map 420. The maximum value is, for example, a maximum value in a range for a weight to be assigned to each of the elements in the speech map 420. For example, when a range of "0" to "1" is determined, a value of "1" is determined as a maximum value. However, the range is not limited thereto, and changes depending on a design.

Each of elements included in the inverted speech map 430 has a value that increases when a correlation level with the speech decreases. For example, a portion around a mouth in a face changes while a human speaks, and accordingly an area including the mouth in the object image 410 has a relatively high correlation level with the speech. Thus, elements associated with the portion around the mouth have relatively high weights in the speech map 420, however, elements associated with the portion around the mouth have lower weights than those of elements associated with an eye in the inverted speech map 430. A relatively bright portion of the inverted speech map 430 corresponds to a relatively low correlation degree with the speech. The inverted speech map 430 is, for example, expressed by an inverted vector.

In an example, the facial expression recognition apparatus recognizes a facial expression of the object based on the inverted speech map 430 and a facial expression feature.

For example, the facial expression recognition apparatus applies the inverted speech map 430 to a facial expression feature extracted from the object image 410. The facial expression recognition apparatus generates a target vector 440 by applying an inverted vector to a facial expression feature vector. The facial expression recognition apparatus multiplies a weight of the inverted speech map 430 by the facial expression feature vector to generate the target vector 440. The weight represents a portion corresponding to the facial expression of the object. The target vector 440 is, for example, a weighted feature vector. However, the generating of the target vector 440 is not limited thereto, and the target vector 440 is generated, for example, based on a function that includes the inverted speech map 430 and the facial expression feature vector as variables. For example, a Hadamard product is used when the inverted speech map 430 and the facial expression feature vector have the same dimension and the same number of elements. In this example, the target vector 440 represents a product of each element in the inverted speech map 430 and each element of the facial expression feature vector.

The facial expression recognition apparatus reduces a value corresponding to a feature associated with the speech in a facial expression feature based on the speech map 420. The facial expression recognition apparatus inverts the speech map 420 indicating the correlation level with the speech and applies the inverted speech map 430 to the facial expression feature, to reduce the value corresponding to the feature associated with the speech. For example, as shown in FIG. 4, a facial expression feature corresponding to an area 443 associated with a mouth in the target vector 440 that is a weighted feature vector is de-emphasized.

In an example, the facial expression recognition apparatus increases a value corresponding to a feature that is not associated with the speech in the facial expression feature based on the speech map 420. The facial expression recognition apparatus inverts the speech map 420 indicating the correlation level with the speech and applies the inverted speech map 430 to the facial expression feature, to increase the value corresponding to the feature that is not associated with the speech. For example, as shown in FIG. 4, facial expression features corresponding to areas 441 and 442 associated with eyes in the target vector 440 are emphasized.

The facial expression recognition apparatus identifies a facial expression of the object based on the target vector 440. For example, the facial expression recognition apparatus determines a facial expression label 450 corresponding to the facial expression of the object from among a plurality of facial expression labels from the target vector 440.

Although the recognition of the facial expression has been described above with respect to FIG. 4, examples are not limited thereto. Operations described above with respect to FIG. 4 are also applicable to a recognition of an object. For example, an object recognition apparatus uses an object model instead of a facial expression model. In this example, the object recognition apparatus applies an inverted speech map to an object feature extracted from an object image based on the object model. A feature associated with a speech is de-emphasized and a feature that is not associated with the speech is emphasized, in the object feature.

Figure 5A:
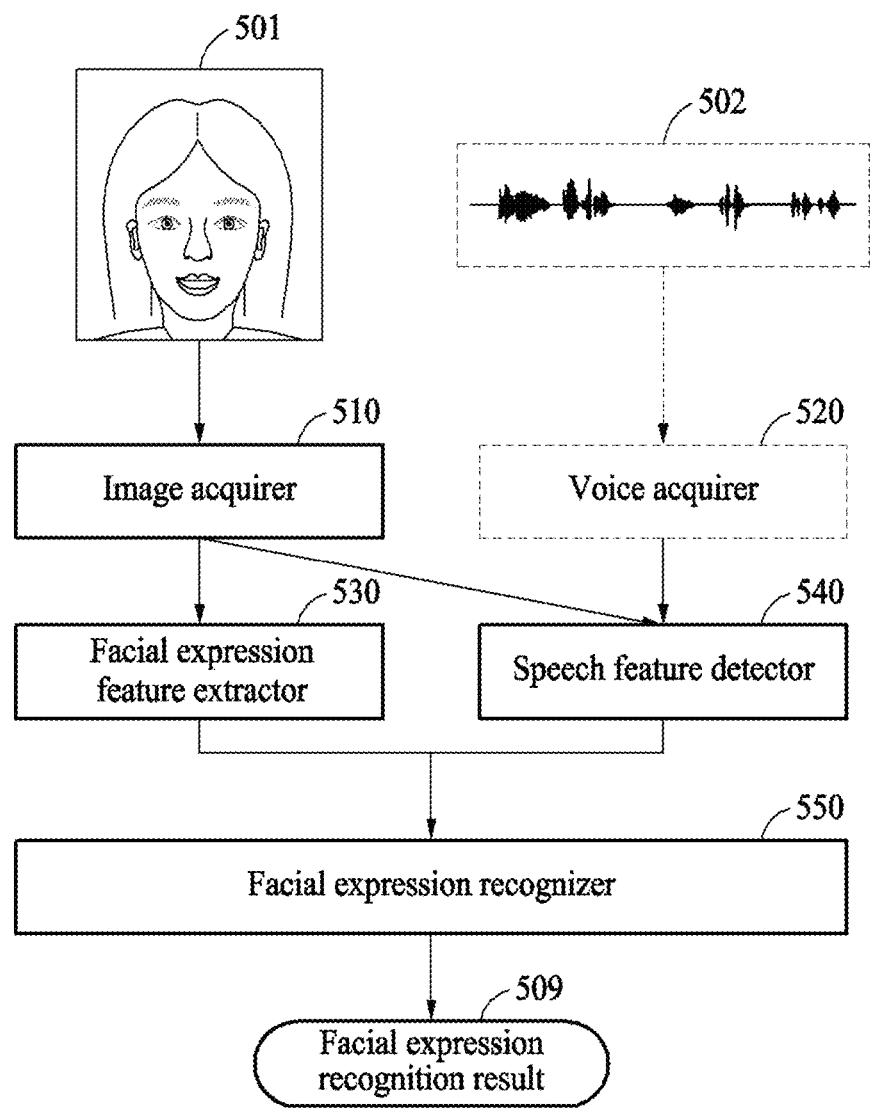
FIG. 5A illustrates an example of a recognition of a facial expression based on a speech feature and a facial expression feature.

FIG. 5A illustrates an example of a recognition of a facial expression based on a speech feature and a facial expression feature.

Referring to FIG. 5A, a facial expression recognition apparatus includes an image acquirer 510, a facial expression feature extractor 530, a speech feature detector 540, and a facial expression recognizer 550.

The image acquirer 510 acquires an object image 501, as described above. The facial expression feature extractor 530 extracts a facial expression feature vector that indicates a portion corresponding to a facial expression of an object, from the object image 501 based on a facial expression model. The speech feature detector 540 extracts a speech feature vector that indicates a portion corresponding to a speech of the object, from the object image 501 based on a speech model. The facial expression recognizer 550 outputs a facial expression recognition result 509 based on the facial expression feature vector and the speech feature vector. The facial expression recognition result 509 is, for example, a label that indicates a facial expression of an object.

In an example, a facial expression is information that represents an emotion, such as anger, contempt, disgust, fear, happiness, sadness, surprise, or neutrality (for example, a lack of an emotion). Also, the facial expression may be, for example, information about a state, such as sleepiness, concentration, negativeness, positiveness, arousal, or balance. However, types of facial expressions are not limited thereto, and different classification systems are used depending on a design. A facial expression label is, for example, a label that indicates one of the types of facial expressions.

The facial expression recognition apparatus may further include a voice acquirer 520. The voice acquirer 520 acquires a voice signal 502 generated in response to a speech of the object. For example, when the voice signal 502 is acquired, the speech feature detector 540 extracts a speech feature vector based on the object image 501 and the voice signal 502. In this example, the facial expression recognizer 550 outputs the facial expression recognition result 509 based on the facial expression feature vector and the speech feature vector.

Figure 5B:
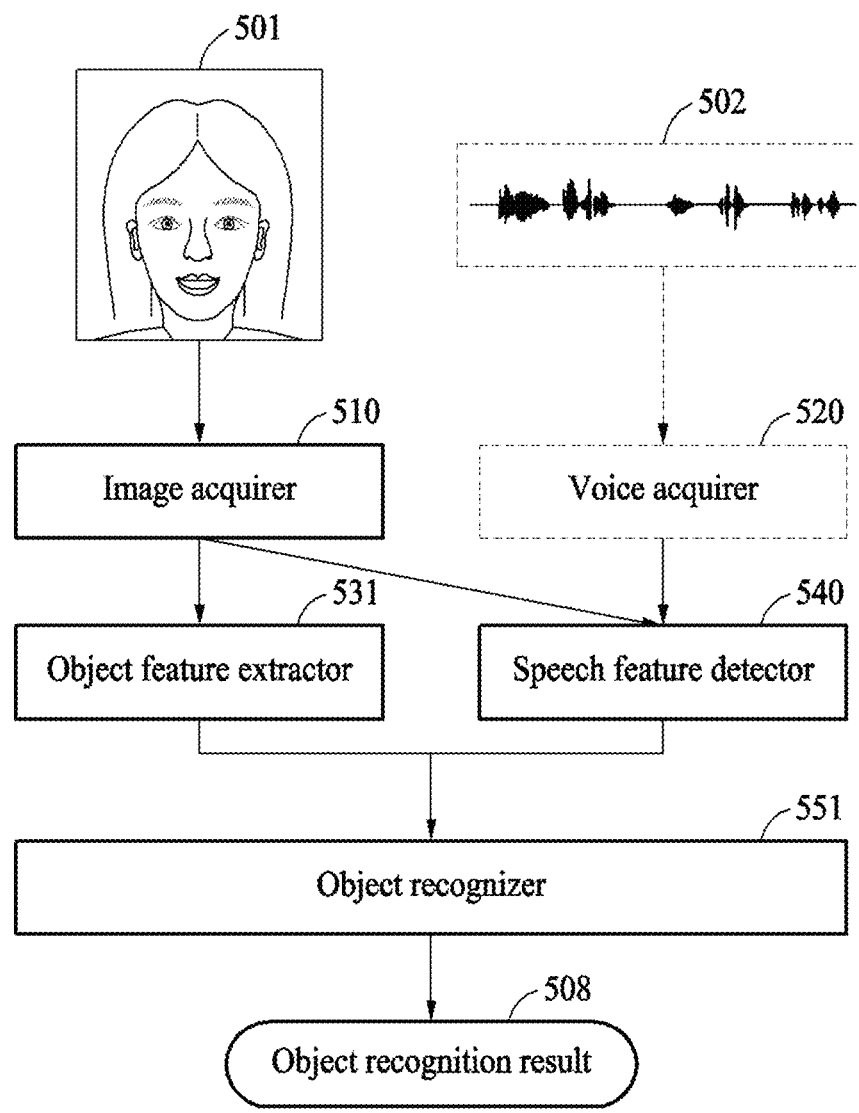
FIG. 5B illustrates an example of a recognition of a facial expression based on an object feature and a speech feature.

FIG. 5B illustrates an example of a recognition of a facial expression based on an object feature and a speech feature.

Although the recognition of the facial expression has been mainly described with reference to FIG. 5A, examples are not limited thereto. Operations described above with reference to FIG. 5A are also applicable to a recognition of an object as shown in FIG. 5B.

For example, an object recognition apparatus uses an object model instead of a facial expression model. Referring to FIG. 5B, the object recognition apparatus includes an object feature extractor 531 and an object recognizer 551, instead of including the facial expression feature extractor 530 and the facial expression recognizer 550 of FIG. 5A, respectively.

The object feature extractor 531 extracts an object feature vector from an object image 501 based on the object model. The object feature vector indicates an abstracted feature of an object. The object recognizer 551 outputs an object recognition result 508 based on the object feature vector and a speech feature vector. The object recognition result 508 is, for example, a label that indicates an identity of the object.

Figure 6A:
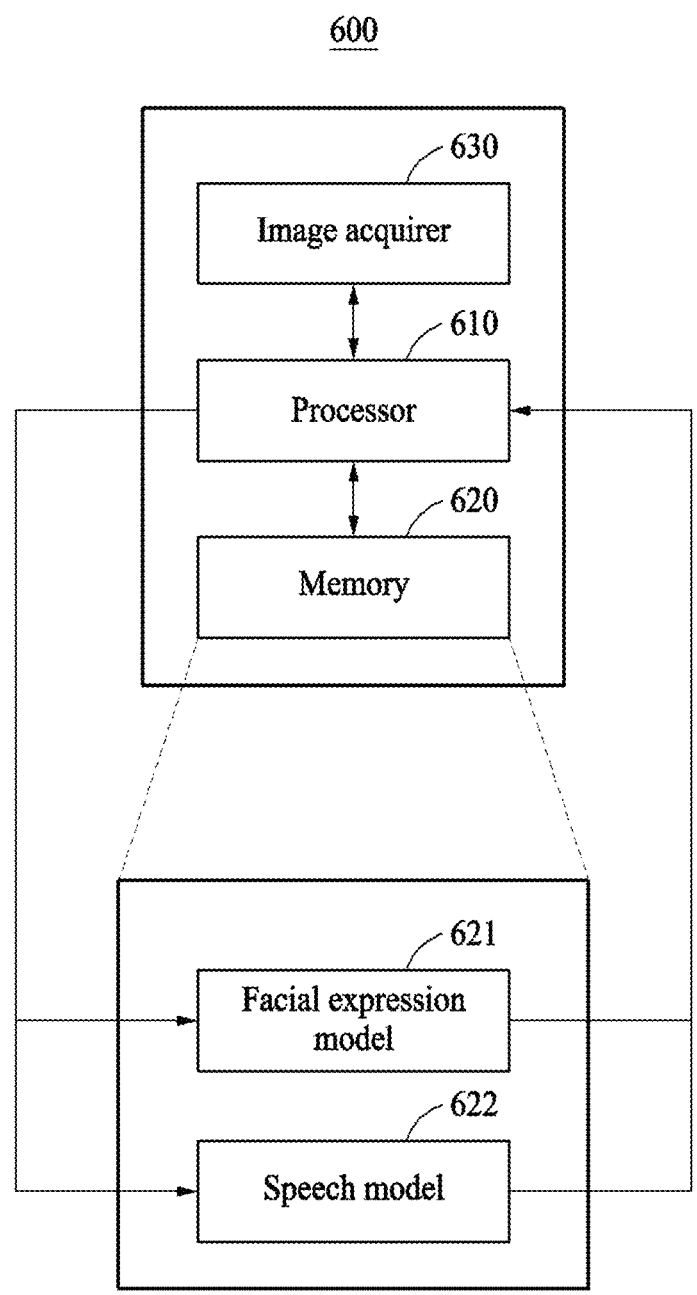
FIG. 6A illustrates an example of a facial expression recognition apparatus based on a speech.

FIG. 6A illustrates an example of a facial expression recognition apparatus 600.

Referring to FIG. 6A, the facial expression recognition apparatus 600 includes an image acquirer 630, a processor 610 and a memory 620.

The image acquirer 630 acquires an object image. For example, the image acquirer 630 includes a camera, and acquires an object image including an object by capturing the object.

The processor 610 recognizes a facial expression of the object from the object image based on a facial expression model 621 and a speech model 622. For example, the processor 610 inputs the object image to the facial expression model 621 and calculates a facial expression feature vector. Also, the processor 610 inputs the object image to the speech model 622 and calculates a speech feature vector. The processor 610 generates a target vector by applying, to the facial expression feature vector, an inverted vector that is generated by inverting the speech feature vector. The processor 610 identifies a facial expression corresponding to the target vector. For example, the processor 610 determines a facial expression label corresponding to the target vector.

The memory 620 stores the facial expression model 621 and the speech model 622. The facial expression model 621 and the speech model 622 are, for example, models that are trained in advance based on training data. Also, the facial expression model 621 and the speech model 622 include, for example, neural networks.

Figure 6B:
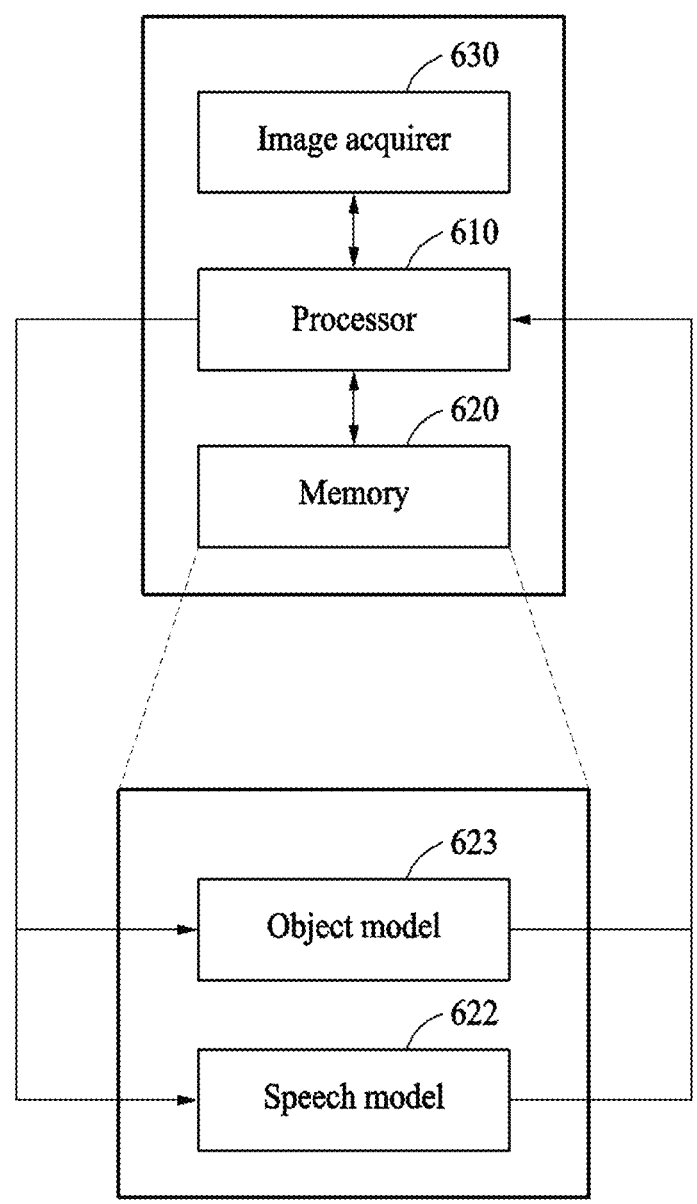
FIG. 6B illustrates an example of an object recognition apparatus based on a speech.

FIG. 6B illustrates an example of an object recognition apparatus 690 based on a speech.

Although a recognition of a facial expression has been mainly described with reference to FIG. 6A, examples are not limited thereto. For example, a speech model is also applicable to a recognition of an object. In this example, the object recognition apparatus 690 uses an object model 623 instead of a facial expression model, together with a speech model 622.

Referring to FIG. 6B, the object recognition apparatus 690 includes a processor 610, a memory 620 and an image acquirer 630, similarly to the facial expression recognition apparatus 600 of FIG. 6A. The memory 620 stores the speech model 622 together with the object model 623, instead of the facial expression model 621. However, examples are not limited thereto, and the memory 620 stores all of the facial expression model 621, the speech model 622 and the object model 623.

The processor 610 recognizes an object from an object image based on the object model 623 and the speech model 622. For example, the processor 610 inputs the object image to the object model 623 and calculates an object feature vector. Also, the processor 610 inputs the object image to the speech model 622 and calculates a speech feature vector. The processor 610 generates a target vector by applying, to the above-described object feature vector, an inverted vector that is generated by inverting the speech feature vector. The processor 610 identifies an object corresponding to the target vector. For example, the processor 610 determines an object label corresponding to the target vector.

However, examples are not limited thereto, and the processor 610 also verifies the object based on the target vector.

The remaining operations of FIG. 6A above, are omitted for convenience of description, but are applicable to FIG. 6B, and are incorporated herein by reference.

Figure 7:
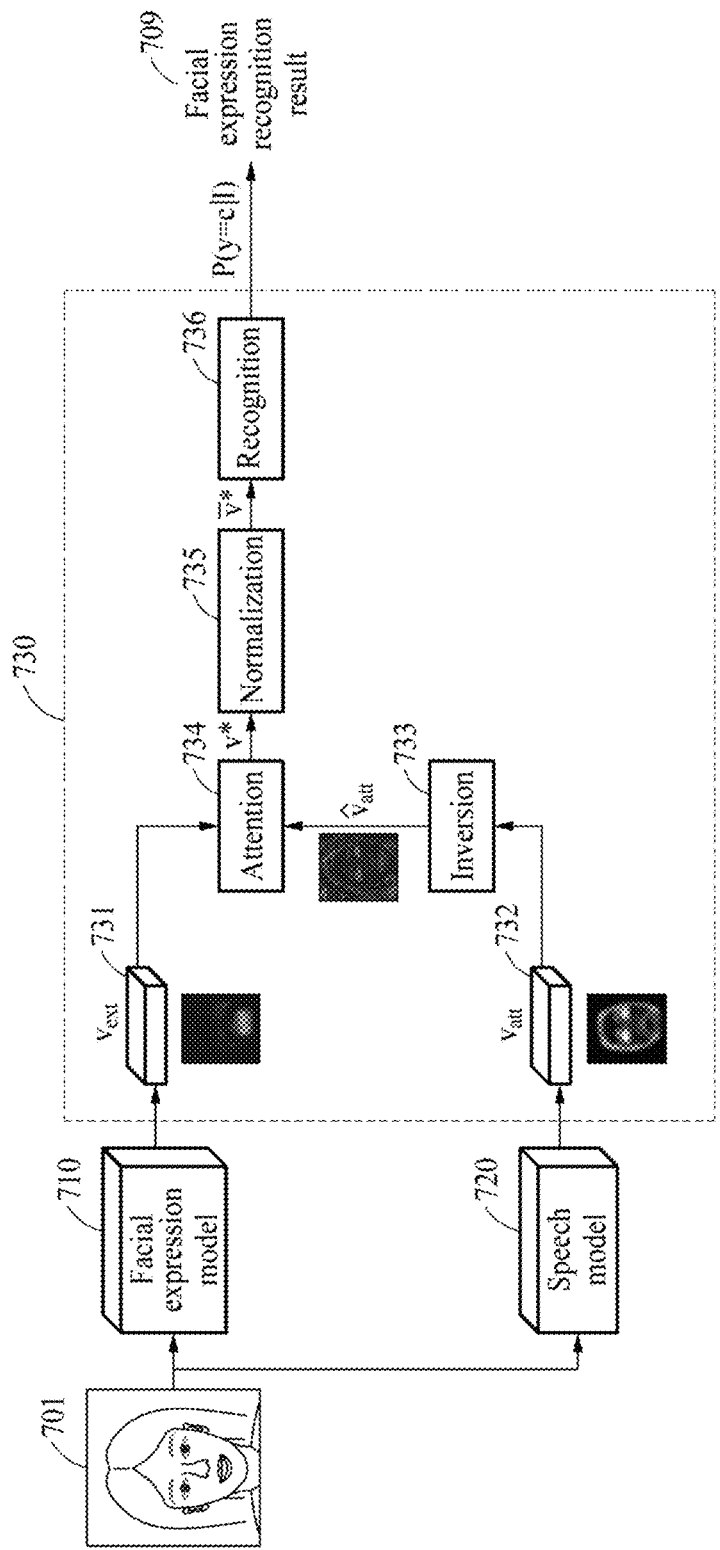
FIG. 7 illustrates an example of a process of outputting a facial expression recognition result based on a speech model and a facial expression model.

FIG. 7 illustrates an example of a process of outputting a facial expression recognition result based on a speech model and a facial expression model.

A facial expression recognition apparatus inputs an object image 701 to a facial expression model 710. The facial expression recognition apparatus calculates a facial expression feature vector $v_{ext}$ from the object image 701 based on the facial expression model 710. The facial expression model 710 is expressed by, for example, $v_{ext}=f_{ext}(I;W_{ext})$ in which I denotes an object image, and $W_{ext}$ denotes a connection weight as a parameter of a facial expression model. Also, $f_{ext}$ denotes a function obtained by modeling of a model that outputs a facial expression feature vector $v_{ext}$ in response to an input of the object image I based on the connection weight $W_{ext}$ i.e., a parameter of a pre-trained facial expression model.

Also, the facial expression recognition apparatus inputs the object image 701 to a speech model 720. The facial expression recognition apparatus extracts a speech feature vector $v_{att}$ from the object image 701 based on the speech model 720. The speech model 720 is expressed by, for example, $v_{att}=f_{att}(I;W_{att})$ in which I denotes an object image, $W_{att}$ denotes a connection weight as a parameter of a speech model. Also, $f_{att}$ denotes a function obtained by modeling of a model that outputs a speech feature vector $v_{att}$ in response to an input of the object image I based on the connection weight $W_{att}$, i.e., a parameter of a pre-trained speech model.

The facial expression recognition apparatus inputs the above-described facial expression feature vector $v_{ext}$ and the above-described speech feature vector $v_{att}$ to a facial expression recognizer 730, and calculates a facial expression recognition result 709. The facial expression recognizer 730 includes a first layer 731 and a second layer 732 to receive the facial expression feature vector $v_{ext}$ and the speech feature vector $v_{att}$, and performs an inversion operation 733, an attention operation 734, a normalization operation 735 and a recognition operation 736.

For example, the facial expression recognition apparatus inputs the facial expression feature vector $v_{ext}$ to the first layer 731. Also, the facial expression recognition apparatus inputs the speech feature vector $v_{att}$ to the second layer 732. The first layer 731 and the second layer 732 each include a plurality of nodes to receive the facial expression feature vector $v_{ext}$ and the speech feature vector $v_{att}$ from the facial expression model 710 and the speech model 720, respectively, and are configured to transfer received vectors to a next layer. The facial expression recognition apparatus generates an inverted vector $\hat{v}_{att}$ by performing the inversion operation 733 on the speech feature vector $v_{att}$. The inversion operation 733 is expressed by, for example, Equation 1 below.

$$\hat{v}_{att} = 1 - v_{att} \qquad \text{[Equation 1]}$$

In Equation 1, the inverted vector $\hat{v}_{att}$ is expressed as a vector obtained by subtracting the speech feature vector $\hat{v}_{att}$ from a maximum value, such as, for example, "1". In Equation 1, each of elements of the speech feature vector $v_{att}$ has a value between "0" and "1," and "1" is determined as a maximum value.

The facial expression recognition apparatus performs the attention operation 734 to integrate the facial expression feature vector $v_{ext}$ and the inverted vector $\hat{v}_{att}$. To integrate the two feature vectors, the facial expression recognition apparatus applies the inverted vector $\hat{v}_{att}$ to the facial expression feature vector $v_{ext}$. For example, the facial expression recognition apparatus generates a target vector $v^*$ by multiplying the facial expression feature vector $v_{ext}$ by the inverted vector $\hat{v}_{att}$. The attention operation 734 is expressed by, for example, Equation 2 below.

$$v^* = v_{ext} \times \hat{v}_{att} \qquad \text{[Equation 2]}$$

The facial expression recognition apparatus performs the normalization operation 735 to normalize the target vector $v^*$, to generate a normalized target vector $\bar{v}^*$. The normalization operation 735 is expressed by, for example, Equation 3 below.

$$\bar{v}^* = \frac{v^* - \min(v^*)}{\max(v^*) - \min(v^*)} \qquad \text{[Equation 3]}$$

In Equation 3, the facial expression recognition apparatus divides a difference between the target vector $v^*$ and a minimum value of the target vector $v^*$ by a difference between a maximum value of the target vector $v^*$ and the minimum value of the target vector $v^*$, to normalize the target vector $v^*$. The normalized target vector $\bar{v}^*$ has a value between "0" and "1."

In an example, the facial expression recognition apparatus performs the recognition operation 736 based on the normalized target vector $\bar{v}^*$, to identify a facial expression of an object. For example, the facial expression recognition apparatus performs the recognition operation 736 based on Equation 4 below.

$$P(y = c \mid \bar{v}^*; W_{rec}) = \frac{e^{z_c}}{\sum_j e^{z_j}}, \text{ where } z_j = \bar{v}^{*T} W_{rec}^j \qquad \text{[Equation 4]}$$

For example, the facial expression recognition apparatus performs the recognition operation 736 based on a pooling layer. In this example, in Equation 4, $W_{rec}$ denotes a connection weight of the pooling layer. Also, c denotes an arbitrary facial expression label, and y denotes a facial expression of an object in a current object image, for example, the object image 701. Accordingly, the facial expression recognition apparatus calculates a probability $P(y=c|\underline{I})$ that the facial expression y corresponds to the facial expression label c with respect to the normalized target vector $\bar{v}^*$ and the connection weight $W_{rec}$ based on Equation 4. The probability $P(y=c|\underline{I})$ is, for example, a probability that the object image 701 corresponds to a particular facial expression label.

Thus, the facial expression recognition apparatus determines the probability $P(y=c|\underline{I})$ using the facial expression recognizer 730 based on Equation 5 shown below. The facial expression recognition result 709 includes, for example, the probability $P(y=c|\underline{I})$.

$$P(y=c|\underline{I}) = P(y=c|v_{ext}, v_{att}; W_{rec}) \qquad \text{[Equation 5]}$$

Although the recognition of the facial expression has been mainly described with reference to FIG. 7, examples are not limited thereto. For example, the facial expression model 710 is replaced by an object model. In this example, an object recognition apparatus recognizes an object based on the object model and the speech model 720.

Figure 8:
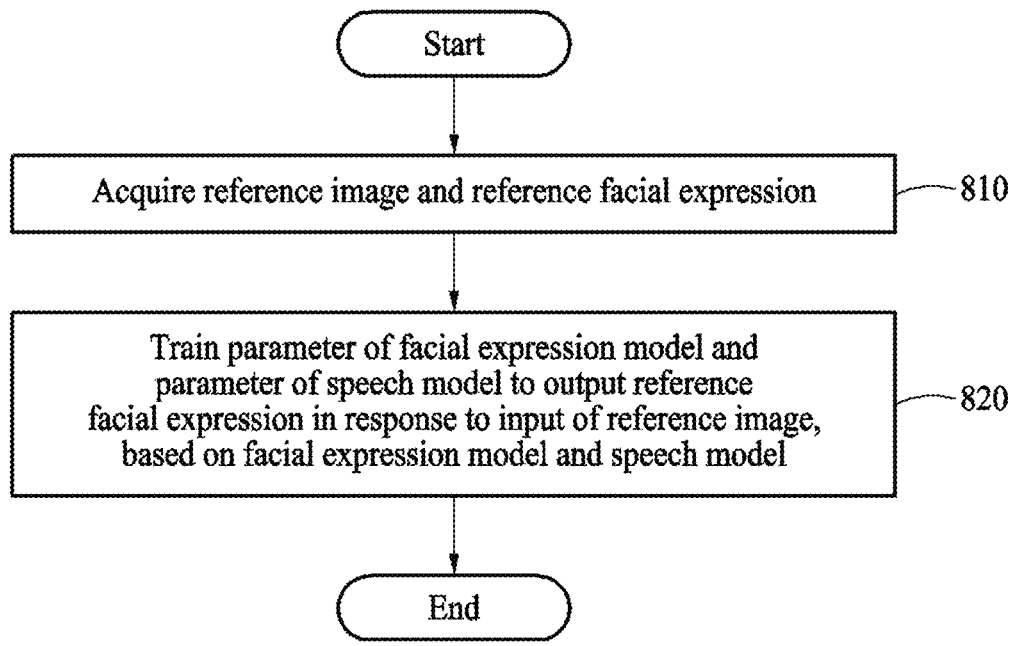
FIG. 8 is a diagram illustrating an example of a facial expression training method based on a speech.

FIG. 8 is a diagram illustrating an example of a facial expression training method based on a speech. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, a facial expression training apparatus acquires a reference image and a reference facial expression. The reference image is, for example, an image including an object provided for training. The reference facial expression is a facial expression mapped to the reference image, for example, a label that indicates a facial expression of an object included in the reference image. Training data includes a pair of the reference image and the reference facial expression. In an example, the facial expression training apparatus loads and acquires training data from a memory. However, examples are not limited thereto, and the facial expression training apparatus acquires training data from, for example, an external device. Also, the facial expression training apparatus further acquires a reference voice corresponding to the reference image.

In operation 820, the facial expression training apparatus trains, using a processor of the facial expression training apparatus, a parameter of a speech model and a parameter of a facial expression model to output the reference facial expression in response to an input of the reference image, based on the speech model and the facial expression model. The facial expression model is used to extract a facial expression feature from an object image, and the speech model is used to extract a speech map from the object image. For example, during the training, the facial expression training apparatus extracts a training speech map and a training facial expression feature from the reference image, calculates a training facial expression label based on the training speech map and the training facial expression feature, and trains the facial expression model to minimize a facial expression loss between the training facial expression label and the reference facial expression. In an example, the facial expression training apparatus restores voice information from the training speech map, and trains the speech model to minimize a speech loss between the restored voice information and the reference voice.

An example of training a facial expression model and a speech model is further described below.

Figure 9:
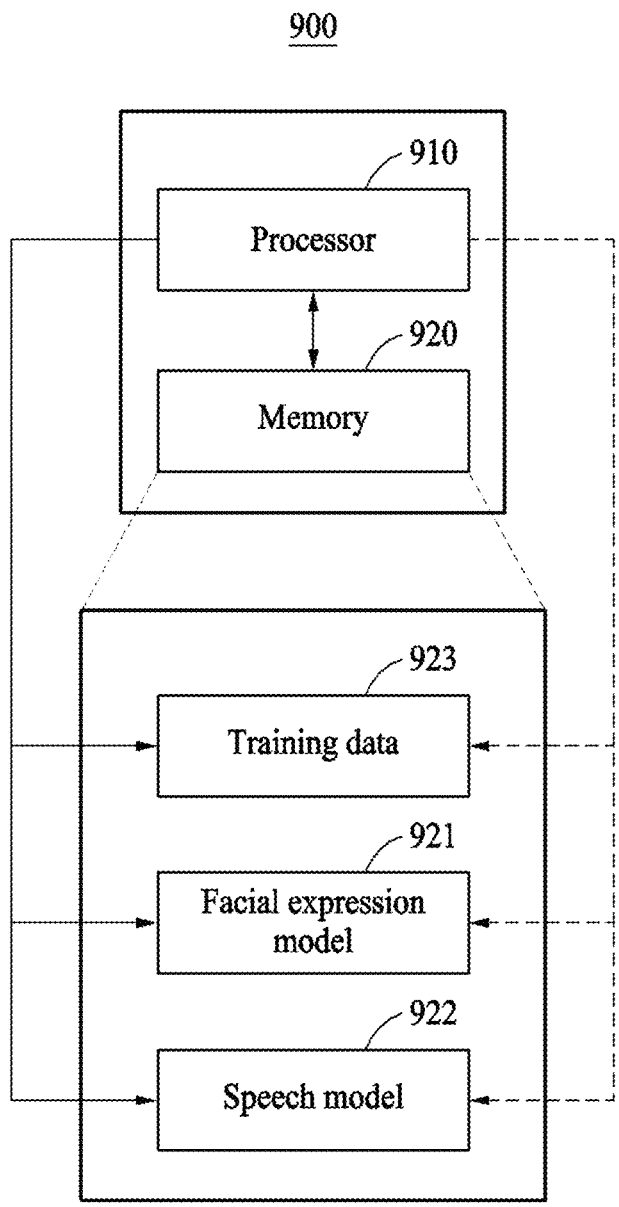
FIG. 9 illustrates an example of a facial expression training apparatus based on a speech.

FIG. 9 illustrates an example of a facial expression training apparatus 900.

Referring to FIG. 9, the facial expression training apparatus 900 includes a processor 910 and a memory 920.

The processor 910 acquires training data 923, as described above, and trains a facial expression model 921 and a speech model 922 based on the acquired training data 923.

For example, the processor 910 trains the speech model 922 so that the speech model 922 outputs a speech feature corresponding to a reference voice when a reference image is input. During the training, the processor 910 extracts a training speech feature from the reference image based on the speech model 922, converts the training speech feature in a form of a voice signal and compares the voice signal to the reference voice. The processor 910 trains the speech model 922 by updating a parameter of the speech model 922 to minimize a speech loss between the reference voice and a training voice restored from the training speech feature.

Also, the processor 910 trains the facial expression model 921 so that the facial expression model 921 outputs a facial expression label corresponding to a reference facial expression when the reference image is input. For example, the processor 910 trains the facial expression model 921 by minimizing a facial expression loss between the reference facial expression and a facial expression that is recognized from the reference image, based on the facial expression model 921 and the speech model 922. During the training, the processor 910 extracts a training facial expression feature from the reference image based on the facial expression model 921, calculates a facial expression label corresponding to the training facial expression feature, and compares the facial expression label to the reference facial expression. The processor 910 trains the facial expression model 921 by updating a parameter of the expression model 921 to minimize a facial expression loss between the reference facial expression and the facial expression label corresponding to the training facial expression feature.

In an example, the facial expression model 921 and the speech model 922 are trained simultaneously, however, examples are not limited thereto. For example, when the speech model 922 is trained and the parameter of the speech model 922 is determined, the facial expression training apparatus 900 trains the facial expression model 921.

The memory 920 stores the facial expression model 921 and the speech model 922. Also, the memory 920 stores the training data 923. The processor 910 loads the training data 923 from the memory 920 and uses the training data 923 for a training operation. The memory 920 stores the facial expression model 921 and the speech model 922 that include parameters that are updated during the training of the facial expression model 921 and the speech model 922.

Figure 10:
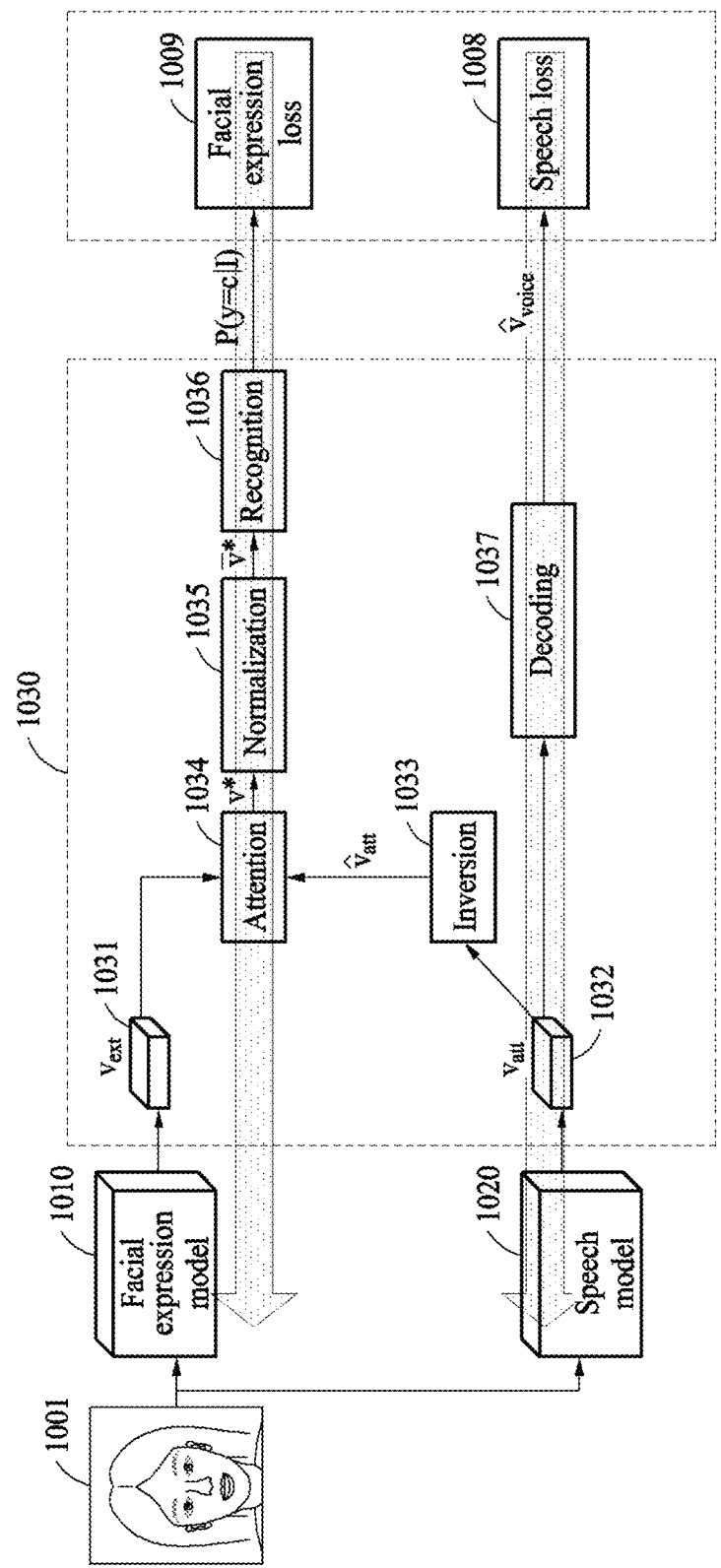
FIG. 10 illustrates an example of a process of training a facial expression model and a speech model.

FIG. 10 illustrates an example of a process of training a facial expression model and a speech model.

A facial expression training apparatus trains a facial expression model 1010 and a speech model 1020 that are configured as described above in FIG. 7. For example, the facial expression training apparatus trains the facial expression model 1010 after training the speech model 1020. However, examples are not limited thereto, the facial expression training apparatus simultaneously trains the facial expression model 1010 and the speech model 1020. The facial expression training apparatus trains the facial expression model 1010 and the speech model 1020 based on training data that includes a pair of a reference image 1001 and a reference facial expression. For example, the training data further includes a reference voice.

For example, to train the speech model 1020, the facial expression training apparatus calculates a speech loss 1008. The facial expression training apparatus calculates a training speech feature from the reference image 1001 based on the speech model 1020. The facial expression training apparatus inputs the training speech feature to a second layer 1032 of a facial expression recognizer 1030. The facial expression training apparatus restores a training voice corresponding to the training speech feature from the training speech feature, through a decoding operation 1037. The training voice is, for example, a voice restored from a training speech feature that is temporarily calculated during training of the speech model 1020. The decoding operation 1037 is expressed by, for example, Equation 6 below.

$$\hat{v}_{voice} = f_{dec}(v_{att}; W_{dec})$$ [Equation 6]

In Equation 6, $v_{att}$ denotes a training speech feature, $W_{dec}$ denotes a parameter of the decoding operation 1037, and $f_{dec}$ denotes a function obtained by modeling of the decoding operation 1037 to restore a training voice $\hat{v}_{voice}$ from the training speech feature $v_{att}$ using the parameter $W_{dec}$. For example, Equation 6 may represent a cross-modality function.

The facial expression training apparatus calculates the speech loss 1008 using Equation 7 shown below.

$$L_{tlk} = \|\hat{v}_{voice} - v_{voice}\|_2^2$$ [Equation 7]

For example, the facial expression training apparatus calculates a speech loss $L_{tlk}$ as an L2-norm between a training voice $\hat{v}_{voice}$ and a reference voice $v_{voice}$ as shown in Equation 7. The facial expression training apparatus trains the speech model 1020 by updating a parameter of the speech model 1020 to minimize the speech loss $L_{tlk}$ in Equation 7. However, a function of the speech loss 1008 is not limited thereto, and various loss functions are used depending on a design.

In response to freezing of a parameter $W_{att}$, i.e., a connection weight, of the speech model 1020 trained to minimize the speech loss $L_{tlk}$, the facial expression training apparatus trains the facial expression model 1010.

To train the facial expression model 1010, the facial expression training apparatus calculates a facial expression loss 1009. The facial expression training apparatus applies a speech map that is extracted from the reference image 1001 based on the speech model 1020 to a facial expression feature that is extracted from the reference image 1001 based on the facial expression model 1010. The facial expression training apparatus inverts the extracted speech map and reflects the inverted speech map to the extracted facial expression feature. The facial expression training apparatus minimizes a facial expression loss between a facial expression label determined based on the facial expression feature to which the speech map is applied and a label corresponding to the reference facial expression.

For example, the facial expression training apparatus calculates a training facial expression feature from the reference image 1001 based on the facial expression model 1010. The facial expression training apparatus inputs the training facial expression feature to a first layer 1031 of the facial expression recognizer 1030. The facial expression training apparatus performs an attention operation 1034 by applying an inverted vector $\hat{v}_{att}$ to the training facial expression feature. The inverted vector $\hat{v}_{att}$ is, for example, a vector obtained by performing an inversion operation 1033 on the training speech feature $v_{att}$. The facial expression training apparatus performs a normalization operation 1035 on a target vector v* generated by the attention operation 1034, to generate a normalized target vector $\bar{v}$*. Also, the facial expression training apparatus determines a probability P(y=c|I) of representing training facial expression label, by performing a recognition operation 1036 on the normalized target vector $\bar{v}$'. For example, the facial expression training apparatus calculates a facial expression loss $L_{rec}$ using Equation 8 shown below.

$$L_{rec} = -\log(P(y=c|I)) \quad \text{[Equation 8]}$$

The facial expression training apparatus trains the facial expression model 1010 by updating a parameter of the facial expression model 1010 to minimize the facial expression loss $L_{rec}$ calculated using Equation 8. However, a function of the facial expression loss 1009 is not limited thereto, and various loss functions are used depending on a design.

Although the facial expression model 1010 and the speech model 1020 are sequentially trained as described above in FIG. 10 for convenience of description, examples are not limited thereto. For example, the facial expression training apparatus updates a parameter of the facial expression model 1010 and a parameter of the speech model 1020 simultaneously to minimize the facial expression loss 1009 and the speech loss 1008 during a single training cycle.

Although examples of a facial expression model for a facial expression have been mainly described with reference to FIGS. 8 through 10, examples are not limited thereto. For example, an object model, instead of the facial expression model, is trained together with a speech model.

For example, training data includes a pair of a reference image and a reference object. An object training apparatus loads and acquires training data from a memory. The object training apparatus trains, using a processor of the object training apparatus, a parameter of the object model and a parameter of the speech model to output the reference object in response to an input of the reference image, based on the object model and the speech model. The object model is used to extract an object feature from an object image, and the speech model is used to extract a speech map from the object image.

During the training, the object training apparatus extracts a training speech map and a training object feature from the reference image. The object training apparatus calculates a training object label based on the training speech map and the training object feature. The object training apparatus trains the object model to minimize an object loss between the training object label and the reference object. Also, the object training apparatus restores voice information from the training speech map, and trains the speech map to minimize a speech loss between the restored voice information and a reference voice.

The remaining operations of FIGS. 8 through 10, although omitted for convenience of description, are applicable to the object training apparatus. For example, the operations of FIGS. 8 through 10 are applicable to the object training apparatus by replacing the facial expression model with an object model, by replacing the facial expression feature with an object feature, by replacing the facial expression label with an object label, by replacing the reference facial expression with a reference object, and by replacing the facial expression loss with an object loss.

Figure 11:
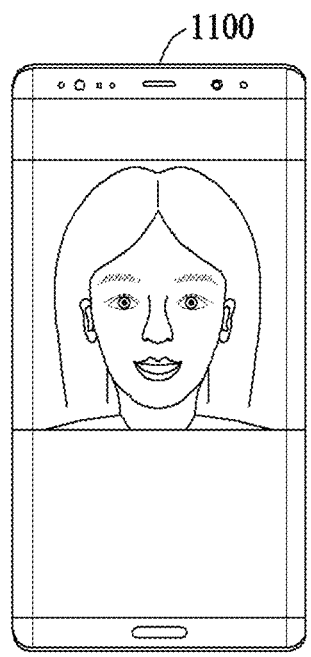
FIGS. 11 and 12 illustrate examples of facial expression recognition apparatuses.
Figure 12:
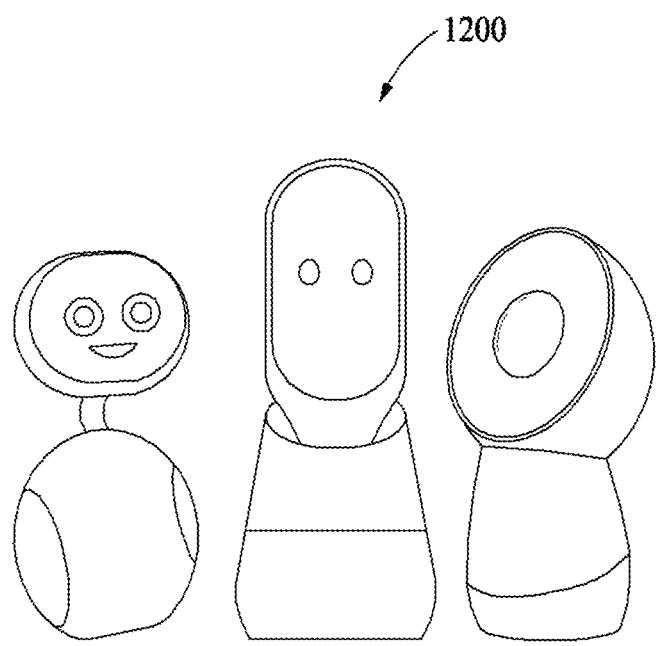

FIGS. 11 and 12 illustrate examples of facial expression recognition apparatuses 1100 and 1200.

The facial expression recognition apparatus 1100 of FIG. 11 is implemented as a mobile device. The facial expression recognition apparatus 1200 of FIG. 12 is implemented as a robot. Also, the facial expression recognition apparatuses 1100 and 1200 are implemented as various smart devices, for example, smart televisions (TVs), wearable smart devices, smart home devices, and various Internet of Things (IoT) devices.

The facial expression recognition apparatuses 1100 and 1200 accurately recognize a facial expression of an object even when the object is speaking. As described above, each of the facial expression recognition apparatuses 1100 and 1200 extracts a speech map, and recognizes the facial expression of the object by focusing on a portion of the object associated with the facial expression and focusing less on a portion of the object associated with a speech. Also, each of the facial expression recognition apparatuses 1100 and 1200 excludes a portion associated with the speech from the object even when a separate voice signal is not acquired.

Although the facial expression recognition apparatuses 1100 and 1200 have been mainly described with reference to FIGS. 11 and 12, examples are not limited thereto. For example, an object recognition apparatus is also implemented as a smart device.

Also, the object recognition apparatus and the facial expression recognition apparatus described above with reference to FIGS. 1 through 12 are combined in a single recognition apparatus. For example, the recognition apparatus includes a facial expression model, an object model, and a speech model. The recognition apparatus generates a target vector by inverting a speech map that is based on the speech model, and applying the inverted speech map to a facial expression feature that is based on the facial expression model and an object feature that is based on the object model. The recognition apparatus recognizes an object or a facial expression based on the target vector.

The facial expression recognition apparatuses 600, 1100 and 1200, the object recognition apparatus 690, the facial expression training apparatus 900, image acquirer 510, facial expression feature extractor 530, speech feature detector 540, voice acquirer 520, facial expression recognizer 550, object feature extractor 531, an object recognizer 551, image acquirer 630, object recognition apparatus 690, facial expression recognizer 730, facial expression recognizer 1030, and other apparatuses, units, modules, devices, and other components described herein with respect to FIGS. 5A-5B, 6A-6B, 7, 9-11 and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A, 3B and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of recognizing a facial expression based on a speech, the method comprising:
   acquiring an object image comprising an object;
   extracting a speech map from the object image based on a speech model;
   extracting a facial expression feature from the object image based on a facial expression model; and
   recognizing a facial expression of the object based on the speech map and the facial expression feature.

2. The method of claim 1, wherein the recognizing of the facial expression comprises:
   reducing a value corresponding to a feature associated with the speech in the facial expression feature, based on the speech map; and
   increasing a value corresponding to a feature that is not associated with the speech in the facial expression feature, based on the speech map.

3. The method of claim 1, wherein the extracting of the speech map comprises generating the speech map by determining a weight based on a correlation between the speech and each area of the object image using the speech model.

4. The method of claim 3, wherein the generating of the speech map comprises:
   increasing a weight of a target area of the object image, in response to an increase in a correlation between the target area and the speech, based on the speech model; and
   decreasing the weight of the target area, in response to a decrease in the correlation between the target area and the speech, based on the speech model.

5. The method of claim 1, wherein the recognizing of the facial expression comprises:
   inverting the speech map; and
   recognizing the facial expression based on the inverted speech map and the facial expression feature.

6. The method of claim 5, wherein the inverting of the speech map comprises inverting the speech map by subtracting values of the speech map from a maximum value.

7. The method of claim 1, wherein
   the extracting of the speech map comprises extracting, based on the speech model, a speech feature vector that indicates a portion of the object image corresponding to the speech of the object, and
   the extracting of the facial expression feature comprises extracting, based on the facial expression model, a facial expression feature vector that indicates a portion of the object image corresponding to the facial expression.

8. The method of claim 7, wherein the recognizing of the facial expression comprises:
   generating an inverted vector by inverting the speech feature vector;
   generating a target vector by applying the inverted vector to the facial expression feature vector; and
   identifying the facial expression based on the target vector.

9. The method of claim 8, wherein the identifying of the facial expression comprises determining a facial expression label corresponding to the facial expression from among facial expression labels, based on the target vector.

10. The method of claim 8, wherein the identifying of the facial expression comprises:
    generating a normalized vector by normalizing the target vector; and
    identifying the facial expression based on the normalized vector.

11. The method of claim 1, wherein the recognizing of the facial expression comprises excluding a voice signal of the object from the recognizing of the facial expression.

12. The method of claim 1, wherein
    the acquiring of the object image comprises:
      acquiring an input image associated with the object and comprising frame images that are consecutive; and
      sequentially selecting a frame image from the frame images as the object image, and
    the recognizing of the facial expression comprises sequentially recognizing facial expressions of the object for each of the frame images.

13. The method of claim 1, further comprising:
    acquiring a voice signal associated with the object,
    wherein the extracting of the speech map comprises extracting the speech map from the object image, based on the voice signal and the speech model.

14. A non-transitory computer-readable storage medium storing instructions that, when executed by a processor, cause the processor to perform a method comprising:
    acquiring an object image comprising an object;
    extracting a speech map from the object image based on a speech model;
    extracting a facial expression feature from the object image based on a facial expression model; and
    recognizing a facial expression of the object based on the speech map and the facial expression feature.

15. A method of recognizing an object based on a speech, the method comprising:
    acquiring an object image comprising an object;
    extracting a speech map from the object image based on a speech model;
    extracting an object feature from the object image based on an object model; and
    recognizing the object based on the speech map and the object feature.

16. A method of training a facial expression based on a speech, the method comprising:
    acquiring a reference image and a reference facial expression; and
    training, by a processor, a parameter of a facial expression model and a parameter of a speech model to output the reference facial expression, in response to an input of the reference image, based on the facial expression model and the speech model,
    wherein the facial expression model is configured to extract a facial expression feature from an object image, and the speech model is configured to extract a speech map from the object image.

17. The method of claim 16, wherein
    the acquiring of the reference image and the reference facial expression further comprises acquiring a reference voice corresponding to the reference image, and
    the training of the parameters comprises:
      restoring voice information from a speech map that is extracted from the reference image based on the speech model; and
      training the speech model by minimizing a speech loss between the restored voice information and the reference voice.

18. The method of claim 16, wherein the training of the parameters comprises training the facial expression model by minimizing a facial expression loss between the reference facial expression and a facial expression that is recognized from the reference image, based on the facial expression model and the speech model.

19. The method of claim 18, wherein the training of the parameters comprises:
applying a speech map extracted from the reference image based on the speech model to a facial expression feature extracted from the reference image based on the facial expression model; and
minimizing a facial expression loss between a facial expression label determined based on the facial expression feature to which the speech map is applied and a label that corresponds to the reference facial expression.

20. The method of claim 19, wherein the applying of the speech map comprises inverting the extracted speech map and reflecting the inverted speech map to the extracted facial expression feature.

21. An apparatus to recognize a facial expression based on a speech, the apparatus comprising:
a memory configured to store a facial expression model, speech model, and instructions; and
a processor configured to execute the instructions to:
acquire an image of an object,
extract a speech map from the image based on the speech model,
extract a facial expression feature from the image based on the facial expression model, and
recognize a facial expression of the object based on the speech map and the facial expression feature.

22. The apparatus of claim 21, wherein the processor is further configured to:
extract, based on the speech model, a speech feature vector indicating a portion of the image corresponding to the speech of the object;
invert the speech feature vector;
extract, based on the facial expression model, a facial expression feature vector indicating a portion of the image corresponding to the facial expression; and
identify the facial expression based on applying the inverted vector to the facial expression feature vector.

23. The apparatus of claim 21, wherein the processor comprises:
an image acquirer configured to capture the image;
a speech feature detector configured to detect, based on the speech model, a speech feature vector indicating a portion of the image corresponding to the speech;
a facial expression feature extractor configured to extract, based on the facial expression model, a facial expression feature vector indicating a portion of the image corresponding to the facial expression; and
a facial expression recognizer configured to determine a label corresponding to the facial expression of the object based on the speech feature vector and the facial expression feature vector.

24. The apparatus of claim 23, wherein the processor further comprises:
a voice acquire configure to acquire a voice signal,
wherein the speech feature detector is further configured to detect the speech feature vector based on the voice signal and the image.

* * * * *